INVENTOR.
Lawrence J. McMurtrey
BY Duane C. Bowen
ATTORNEY

Oct. 6, 1964     L. J. McMURTREY     3,151,596
NUCLEAR POWERED WATER JET ENGINE
Filed Dec. 3, 1959     8 Sheets-Sheet 5

INVENTOR.
Lawrence J. McMurtrey
BY Duane C. Bowen
ATTORNEY

INVENTOR.
Lawrence J. McMurtrey
BY Duane C. Bowen
ATTORNEY

INVENTOR.
Lawrence J. McMurtrey
BY *Duane C. Bowen*
ATTORNEY

Oct. 6, 1964         L. J. McMURTREY         3,151,596
NUCLEAR POWERED WATER JET ENGINE
Filed Dec. 3, 1959         8 Sheets-Sheet 2

INVENTOR.
Lawrence J. McMurtrey
BY Duane C. Bowen
ATTORNEY

Oct. 6, 1964   L. J. McMURTREY   3,151,596
NUCLEAR POWERED WATER JET ENGINE
Filed Dec. 3, 1959   8 Sheets-Sheet 1

INVENTOR.
Lawrence J. McMurtrey
BY
ATTORNEY

United States Patent Office 3,151,596
Patented Oct. 6, 1964

3,151,596
NUCLEAR POWERED WATER JET ENGINE
Lawrence J. McMurtrey, Wichita, Kans., assignor to Boeing Airplane Company, Wichita, Kans., a corporation of Delaware
Filed Dec. 3, 1959, Ser. No. 857,139
9 Claims. (Cl. 115—14)

My invention relates to a propulsive unit for surface and underwater ships comprising a jet type engine in which the fluid stream is water, the source of energy is a nuclear fuel material, and the fluid stream is heated directly by the nuclear fuel material or with an interposed energy transfer system. Nuclear fuel material is defined for the purpose of this specification as fuel producing energy by fission of one or more components. A nuclear fusion reaction energy source may be used in a modified system.

This is a continuation-in-part of a previous, copending patent application, Serial Number 717,162 filed February 24, 1958, now abandoned.

Nuclear power as a source of propulsive energy has been used in ships, although the prior nuclear propulsive systems have been different from the system disclosed herein. Potential advantages of nuclear power plants include low weight of fuel and long life of the engine before refueling is necessary. However, the applications of nuclear engines have been hampered partly because of the need for complicated systems and heavy engine shielding to prevent damage to materials and harm to personnel. The present invention has advantages for use as an engine for ships partly because of economy, simplicity, reduction of the shielding problem, and lower weight.

The objects of my invention include: to devise an improved nuclear propulsive system for ships; to devise a nuclear powered water jet engine for ships; and to provide an improved nuclear engine installation for surface and underwater ships of more simple construction, more reliable, requiring less maintenance, adapted to reduce the amount of shielding required on the ship, of less weight, and more economical than previous engines.

My invention will be best understood, together with additional objectives and advantages thereof, from a reading of the following description, read with reference to the drawings, in which.

According to my invention, a ramjet, turbojet or other jet engine such as a combination ram-turbojet is used as a power plant for a surface or underwater ship. The jet engine is preferably supported outside of the ship hull and under the water. The working fluid for the jet engine is sea water. Energy is supplied to the working fluid in a heat exchanger by heat from a nuclear source of energy. The heat exchanger may contain nuclear fuel elements directly heating the sea water passing through the engine. The nuclear fuel elements instead may be located other than immediately adjacent to the water passageways and a heat transfer system may be used between the fuel elements in a reactor and the heat exchanger in the engine.

The propulsion system will be discussed in the following order:

(1) The structural details shown in the drawings and the general operation.

(2) The application of nuclear energy as a source of heat.

(3) The thermodynamics relating to the use of water as a working fluid in a jet engine and the heating thereof directly or indirectly by energy from a nuclear source.

(4) Examples of the use of the present invention to meet the power requirements of certain vessels.

Sufficient details are given so that the propulsion system will be thoroughly understood by those working in the art. After examining the present disclosure, the construction of an engine for any particular vessel would be a straightforward detail design for those working in the arts of jet engines, water and steam systems, and nuclear reactors. The present discussion would be unduly protracted if much of the knowledge in these fields, applicable to my propulsion system, were to be repeated, i.e., the design of jet exhaust nozzles, inlet ducts, turbines, and the like, or the design of fuel elements, moderators, control rods and systems, protective coatings for fuel elements, and cooling systems. For this reason, some aspects of the propulsion system, particularly matters common in the design of jet, water and steam engines and systems and of nuclear reactors and not peculiar to the requirements of the present engine, will be given summary discussion. The most detailed discussion will be on the thermodynamics of the water system because it is believed that appreciation of the thermo- 3,151,596

FIGURES 1–6

Figure 1:
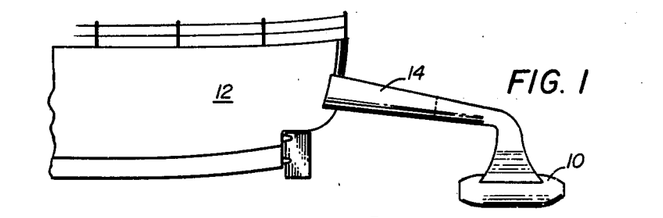
FIGURE 1 is a side view of the rear portion of a ship and a nuclear powered water jet engine installed thereon and forming a specific embodiment of my invention.

FIGURE 1 shows an installation of a nuclear powered water jet engine 10. The ship 12 may be a surface or an underwater craft and when the word "ship" is used it is inclusive of both types of vessels. Engine 10 is supported on a cantilevered, bifurcated arm structure 14 extending aft and supported from the stern framework of ship 12. When the engine is positioned a considerable distance behind the ship, i.e., fifty feet, the problem of shielding the ship and personnel is substantially alleviated because the water acts as a good shielding medium for fast and thermal neutrons, and for gamma rays.

Figure 2:
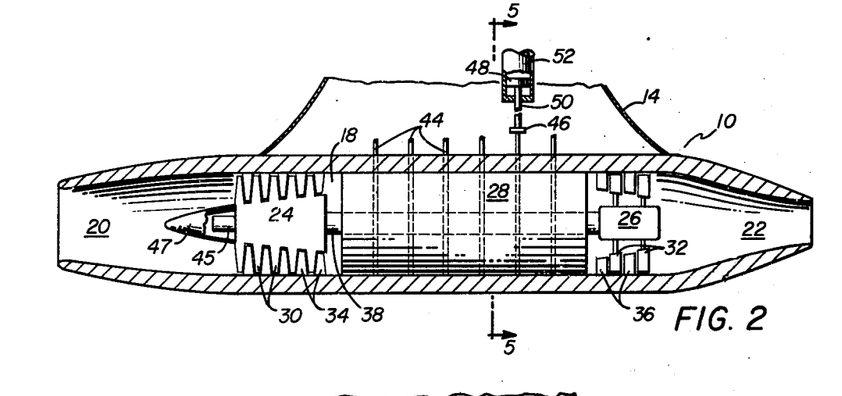
FIGURE 2 is an enlarged view, partly in section, of a turbojet type engine according to my invention.

The engine shown in FIGURE 2 is of turbojet type having in the inner water passageway 18 an inlet duct 20, an exit nozzle 22, a pump 24, a turbine 26, and a heat exchanger 28 therebetween. Moving blades 30, 32 are attached to pump 24 and turbine 26 and are interfingered with stationary blades 34, 36 secured to the engine inner walls. In general configuration the pump and turbine, shown symbolically, are similar to compressor-turbine structures for air turbojet engines and the design considerations are common to other water and steam conduits, pumps and turbines. Preferably member 24 is referred to as a pump rather than a compressor as water, although it may be highly pressurized, is relatively uncompressible. Pump 24 and turbine 26 are interconnected by shaft 38.

When engine 10 is started, an electric motor 45 is used to operate pump 24 until turbine 26 has sufficient power to operate the pump through shaft 38. Electric motor 45 is located in a housing 47 immediately forward of pump 24.

Figure 3:
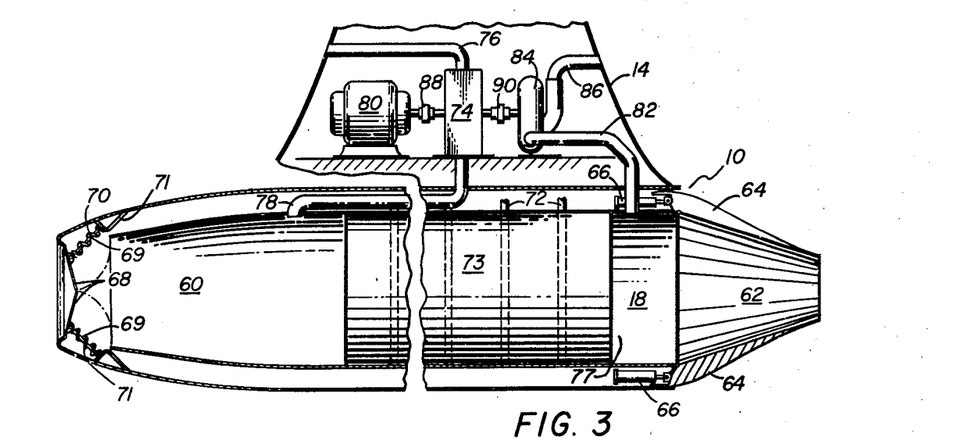
FIGURE 3 is an enlarged view, partly in section, of a ramjet type engine.
Figures 4, 5, 6:
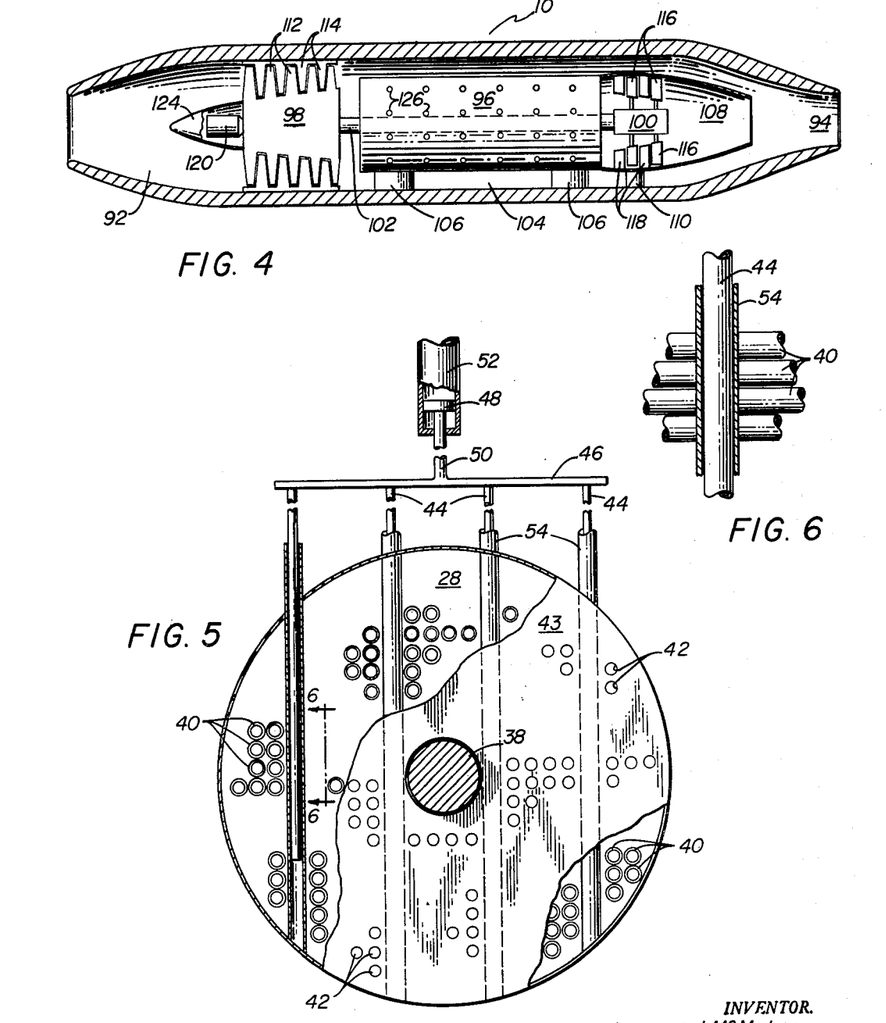
FIGURE 4 is a view, partly in section, of a combined ram-turbojet type engine.
FIGURE 5 is an enlarged fragmentary view taken partly in section on line 5—5 of FIGURE 2, only part of the heat exchanger tubes being shown.
FIGURE 6 is a fragmentary enlarged view, partly in section, taken generally on line 6—6 of FIGURE 5.

Heat exchanger 28 is shown in more detail in FIGURE 5 and is seen to be formed by a multiplicity of tubes 40. The tubes are formed of nuclear fuel material and constitute the fuel elements for the engine in the FIGURES 2–4 direct radiation system. The tubes for the FIGURES 7–8 indirect heating system may be thinner and may be formed of single wall stainless steel. Parts of the heat exchanger of FIGURE 5 are generally similar to those shown in U.S. Patent 2,806,820, issued to E. P. Wigner on September 17, 1957, and details not given in the present description can be taken from the Wigner patent or from other sources in the art of nuclear reactors, and this will be within the skill of workers in that field. As before stated, when the term "nuclear fuel material" is used this is meant to include the various types of nuclear fuel sources releasing energy by a fission reaction. When not otherwise specified, the references in the specification to nuclear power, engines, reactors and the like are to systems using fissionable nuclear fuel material. However, nuclear fusion reaction systems, when developed beyond their present experimental state, may be substituted as applicable, as will be understood by those working in the art.

The fabrication of fuel elements from fissionable nuclear fuel material is a separate and fast growing art and it will be understood that various compounds may be used to form tubes 40. For purposes of illustration, tubes 40 may be formed of enriched uranium slugs having an inner and an outer thin stainless steel jacket. The water flows between pump 24 and turbine 26 through the openings 42 in tubes 40 and the space between the outer surfaces of tubes 40 is preferably closed by a heat exchanger end plate 43. The spacing and size of the tubes are only generally indicated and preferably, when optimized, the area of the tube passageways 42 is about 50% of the frontal area of the heat exchanger. Higher passageway area ratios can be achieved by drilled and lined openings in nuclear fuel material blocks.

A series of rows of control rods 44 are provided. Each row is supported by a crosshead 46 which is secured to a piston rod 50 of a piston 48. Piston 48 is disposed in a hydraulic cylinder 52 and the hydraulic system is controlled by automatic or semiautomatic means to position control rods 44. Control rods 44 are slidably supported for movement in and out of the bank of tubes 40 by tubular supports 54. The construction of control elements and of automatic or semiautomatic positioning means is well known in the art. For purposes of illustration the control elements may be considered to comprise stainless steel tubes loaded with compacted boron carbide powder. Other control rods are presently in use or under development. For example, Chemical and Engineering News for January 6, 1958, page 56, describes the use of hafnium and the proposed use of a cadmium-indium-silver alloy. The control rods act progressively to slow the fission of the nuclear fuel material as they are moved inwardly. The temperatures of walls of tube passageways 42 are controlled by the positions of the control rods. Other details of the nuclear aspects of the engine will be discussed in a later section of this discussion.

Operation of the FIGURES 1, 2, 5 and 6 turbojet type engine is accomplished by first operating pump 24 and turbine 26 by electric motor 45. Control rods 44 are moved outwardly of heat exchanger 28 and the nuclear fuel material forming tubes 40 heats the water passing therethrough. When the water is sufficiently heated to obtain propulsion to turn turbine 26, electric motor 45 may be switched off. Thereafter propulsive force is obtained by heating water in tubes 40. The water has high pressure and temperature but is maintained in a saturated condition and does not vaporize until it passes out of heat exchanger 28. In the turbine 26 and the exit nozzle 22, part of the water flashes into steam. A small part of the energy is consumed by the turbine to provide power for pump 24 and the remainder of the usable energy acts to increase velocity in the nozzle. The engine is shut down by moving control rods 44 inwardly of heat exchanger 28, thereby terminating heating of the water, when propulsive power for the ship is to be terminated.

Figure 16:
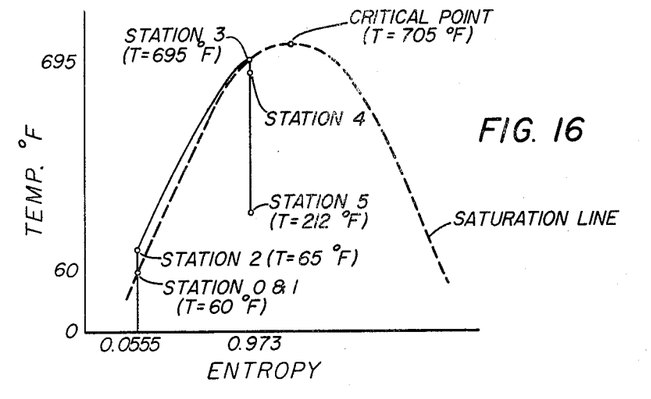
FIGURE 16 is a graph showing, for a specific example, the temperature-entropy relationships for the water from inlet to exit in the turbojet type engine.
Figure 17:
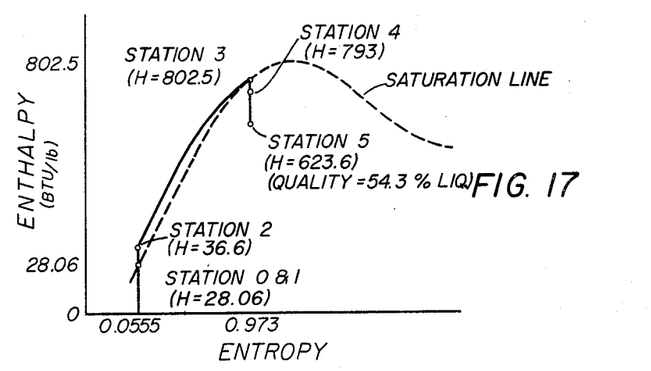
FIGURE 17 is a graph similar to that of FIGURE 16 only showing enthalpy-entropy relationships.
Figure 18:
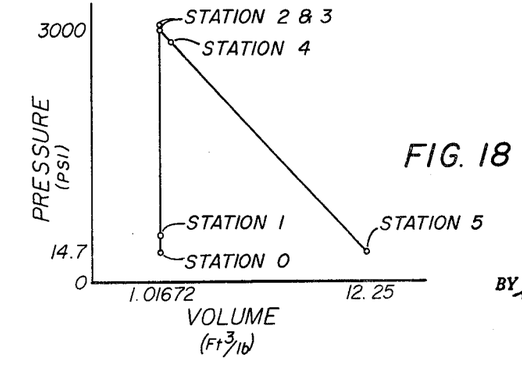
FIGURE 18 is a graph similar to that of FIGURE 16 only showing pressure-volume relationships.

The thermodynamic relationships in the turbojet engine are explained more completely by the diagrams of FIGURES 16, 17 and 18. For a specific example, the water before entering the engine (Station 0) is 60° F. and has 14.7 p.s.i. atmospheric pressure (the figure 14.7 p.s.i. is used in the specification for convenience although the pressure will be somewhat higher according to the depth of the engine below the surface of the water); it is pumped to a pressure of 3000 p.s.i. at Station 2 by the pump (pump inlet is Station 1 and pump outlet is Station 2); conditions are maintained preventing vaporization in the heat exchanger as the water is heated to 695° F. (exchanger inlet is Station 2 and exchanger outlet is Station 3); the water expands partly in the turbine to the extent required to drive the pump (turbine inlet is Station 3 and turbine outlet is Station 4); and the water expands in the nozzle to atmospheric pressure (14.7 p.s.i.) and a temperature of 212° F. at Station 5 at the after end of the nozzle.

The dotted lines in FIGURES 16 and 17 are the saturation lines. The full lines in FIGURES 16–18 are the theoretical thermodynamic cycles. The actual cycles are quite similar only having slight losses due to inefficiencies involved. The water is expanded isentropically through the turbine where sufficient energy is extracted to drive the pump. Because of the small amount of energy used by the turbine, it would be feasible to by-pass most of the water directly to the nozzle. The expansion through the nozzle (Stations 4 to 5) uses the remainder of the available energy to increase water velocity. It can be seen that 46.7% of the water has turned to vapor at Station 5 providing the necessary increase in volume to effect the volocity increase. The total volume when expanded is about twelve times that in the heat exchanger (between Stations 2 and 3). The velocity at Station 5 is 2921 ft./sec. which provides 91 pounds of thrust for each pound of fluid flowing. At a flow velocity in the heat exchanger tubes of 35 ft./ sec., assuming 50% of the exchanger frontal area is flow area, the total flow is 1040 pounds per square foot of frontal area. The thrust is thus 95,000 pounds per square foot of frontal area. A ramjet cycle would be similar except the pump and turbine would be omitted, e.g., the diagrams of FIGURES 16–18 may be considered as if Stations 2 and 4 were omitted and necessary modifications in the curves were made. The 3,000 p.s.i. pressure would be for a 395 knot engine speed assuming that the variable exit nozzle is used to maintain velocity in the heat exchanger tubes at 35 ft./sec.

FIGURE 3 shows a ramjet engine having an inlet duct 60 and a variable, segmented exit nozzle 62 having segments 64 actuated by hydraulic piston and cylinders 66. Pivotal inlet doors 68 are normally closed by springs 70 secured to rods 69 and acting against abutment surfaces on brackets 71. Doors 68 are closed until the ram force of water is sufficient to overcome springs 70. Thus water in inlet 60 is partly segregated when the doors are closed, although it is in communication with the outside water through line 78 and through the water passageways in exchanger 73. To start the engine, control rods 72 are moved upwardly and a centrifugal pump 74 is actuated bringing in outside water through pipe 76 and discharging the water through pipe 78 to the forward side of heat exchanger 73. The water is discharged from the engine through exit nozzle 62 which is reduced to its smallest diameter during the starting cycle. When the water is sufficiently heated by heat exchanger 73, enough propulsive force will be obtained from the water passing out the nozzle to move the engine (and ship). When sufficient engine velocity has been obtained, ram water will open doors 68 against the action of springs 70. Water from that point on will be supplied by ram action and the action of centrifugal pump 74 may be discontinued.

As is clearly shown in the drawings, water passing from heat exchanger 73 to the area 77 immediately forward of exit nozzle 62 is provided room to expand and, as in the case of the turbojet engine, the water is brought to a saturated condition, just short of vaporization, in the exchanger and then part of the water flashes into steam when it leaves the exchanger tubes and enters the larger area 77. The velocity of the stream is increased, the volume of the water-steam mixture increases and temperature and pressure decrease. Control of vaporization may be accomplished in the engines described herein primarily by the position of control rods 72, e.g., the amount of heating by nuclear energy permitted, and the automatic and/or semiautomatic system for sensing and controlling vaporization will be readily understood by those working in the art.

During the starting cycle an electric motor 80 powers centrifugal pump 74. In some installations it may be desirable during the starting cycle to bypass part of the heated water from the rear end of heat exchanger 73 through pipe 82 to a turbine 84 to power pump 74 after the action has been started by electric motor 80. Discharge of water from turbine 84 to the outside is through pipe 86. Shafts and couplings 88, 90 are provided between centrifugal pump 74, motor 80, and turbine 84.

FIGURE 4 shows a combined ram-turbojet bypass engine having an inlet duct 92, an exit nozzle 94, and a heat exchanger 96. Disposed in series are a pump 98, heat exchanger 96, and a turbine 100. Pump 98 and turbine 100 are connected by a shaft 102. The construction is generally similar to FIGURE 2 with the exception that a bypass for water is provided through channels 104 at the side of heat exchanger 96 and turbine 100. Pump 98 extends from wall to wall of the engine but the flow is then separated and part goes through the tubes of heat exchanger 96 to turbine 100 and part goes through channels 104. The water going through channels 104 receives heat from the periphery of heat exchanger 96 but preferably tubes are not used in this area so that higher ram pressures are achieved than would be obtained if heat exchanger 96 bridged the engine water passageway in this area.

Heat exchanger 96 is supported by leg members 106 from the inner engine walls and a housing 108 about turbine 100 is supported by legs 110. Housing 108 segregates water passing about the periphery of heat exchanger 96 until it reaches the rear of turbine 100 where it joins the stream passing through the turbine. Pump 98 is shown symbolically to have moving blades 112 and to have fixed blades 114 secured on the engine's inner walls. Turbine 100 has moving blades 116 and fixed blades 118 are supported by housing 108. Pump 98 is moved in the starting cycle by an electric motor 120 in a housing 124 at the forward end of the pump.

Heat exchanger 96 has control rods 126 operated by a mechanism similar to that shown in FIGURE 5. The fuel elements of the heat exchanger heat water passing therethrough and the pump and turbine act essentially the same as the FIGURE 2 construction. Heat exchanger 96 also heats water passing through channels 104.

Figure 7:
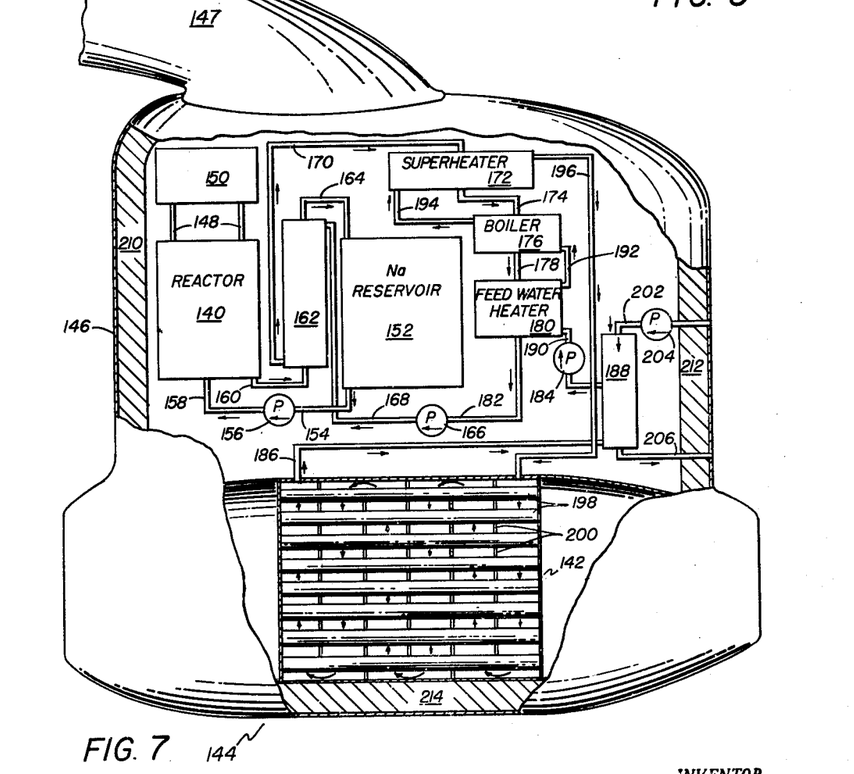
FIGURE 7 is an essentially schematical view of an engine installation using a sodium transfer system between a reactor and the engine heat exchanger.
Figure 8:
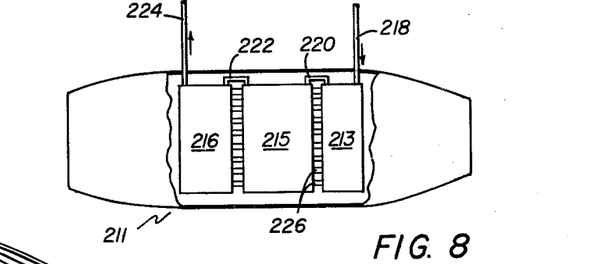
FIG. 8 is a schematical view of a modification of part of the system shown in FIGURE 7.

FIGURES 7 AND 8

Direct heating of the water by having the nuclear fuel material contained within the heat exchanger, as by having the heat exchanger tubes contain nuclear fuel material (FIGURES 1–6), will be preferred in some installations to an indirect system in which a heat exchanging system is interposed between a remote reactor and a heat exchanger. Such a direct heating system is covered when it is stated in the claims that the nuclear fuel material is contiguous to the heat exchanger water passageways, e.g., this is defined to mean that the nuclear fuel material is close enough to the water passageways to heat the water directly without any interposed system. Direct heating is less complicated and more efficient in some installations, but special attention has to be given to the problem of sea water contamination.

An interposed sodium system is disclosed in connection with FIGURES 7 and 8. A sodium system of this type is shown at pages 111–127 of the publication Proceedings of the SRE-OMRE Forum, TID–7525 (NAA-SA–1804), issued June 15, 1957, available from the Office of Technical Services. Other publications, patents, and reactors in present use give ample details on the construction, operation and control of sodium and other interposed heat transfer systems and of reactors usable therewith, and the present description will be limited in order to avoid undue repetition of details well known in the art.

Referring to FIGURE 7, a sodium heat transfer system is shown interposed between a fast nuclear reactor 140 and a heat exchanger 142 of a jet engine 144. The engine is indicated to be of ramjet type, but it will be understood that the system is equally applicable to other water jet engines such as the turbojet and combination jet shown in the other drawings. The view is somewhat schematical and the housing 146 for the reactor and coolant systems would be substantially more compact because of juxtaposition of units now shown in superposition.

Other coolant transfer systems besides sodium are applicable, as will be understood. The system shown in FIGURE 7 is to be taken as representative of installations in which the reactor is located remotely, so that the sea water is not directly heated by the fuel elements. The reactor is preferably contained in a housing 146 joining with the engine 144 and supported from the ship by the cantilevered structural support 147. If the reactor instead is located in the ship, the advantage before recited is lost of using the sea water for at least part of the reactor shielding.

The system is shown schematically and is a simplified form of that shown in the Walter H. Zinn Patent 2,841,545, and that patent can be consulted for details which are omitted from the present disclosure for brevity and to avoid unnecessary elaboration. The application of a simpler or a more complex system, or one using a different coolant is within the skill of the art.

Reactor 140 contains nuclear fuel elements or other nuclear source. Control rods 148 are shown actuated by a control rod actuator mechanism 150. The primary coolant, sodium, is pumped from reservoir 152 through line 154 by pump 156 and then through line 158 to reactor 140. The sodium coolant, under the force of the pump, passes through reactor 140, thereby picking up heat, through line 160 to primary heat exchanger 162 and then through line 164 back to reservoir 152. The primary and other heat exchangers shown have the configurations of simple shell and tube heat exchangers although more sophisticated types can be used. The details of construction of the foregoing parts numbers 140, 148, 150, 152, 156 and 162 and other parts, including various alternative structures, can be selected from the various patents and publications cited, particularly the Zinn patent which describes operating conditions and which relates many of the problems specific to sodium systems and discloses suitable design solutions.

A steam system, containing water as a working fluid, is used to pick up heat from a NaK circuit intermediate the steam and sodium systems. The stem generation system is conventional and is similar to that shown in the Zinn patent, although simplified, and will be understood from the patent and from standard publications on water-steam power plants. The water is heated by a secondary coolant system, which contains NaK, as in the Zinn patent. The sodium-potassium eutectic alloy is forced by pump 166 through line 168 to primary heat exchanger 162 where it picks up heat, and then through line 170 past superheater 172, through line 174, past boiler 176, through line 178, past feed water heater 180, and through line 182 back to pump 166. Heat is transferred, at successively lower levels, to superheater, boiler and feed water heater.

The water is forced by pump 184 from engine heat exchanger 142, through line 186, past condenser 188, through line 190, having pump 184 interposed therein, past feed water heater 180, through line 192, past boiler 176, through line 194, past superheater 172, and through line 196 to engine heat exchanger 142. The engine heat exchanger 142 is shown as having a shell and tube configuration in which the superheated steam from superheater 172 first passes the after end of the sea water passageway tubes 198 and is led in a tortuous course by divider walls 200 to the forward end of exchanger 142. The sea water entering tubes 198 thus is heated by the lower temperature steam before the steam is exhausted through line 186. The steam in line 186 may be condensed to liquid water by the use of a condenser 188, the condenser coolant being supplied by sea water pumped from outside of housing 146 through line 202, having a pump 204 interposed therein, past condenser 188, and out of housing 146 through line 206. If the fluid leaving exchanger 142 through line 186 is of low enough energy level, condenser 188 may be omitted. The water is heated to superheated steam as it passes through heater 180, boiler 176, and superheater 172.

Figure 14:
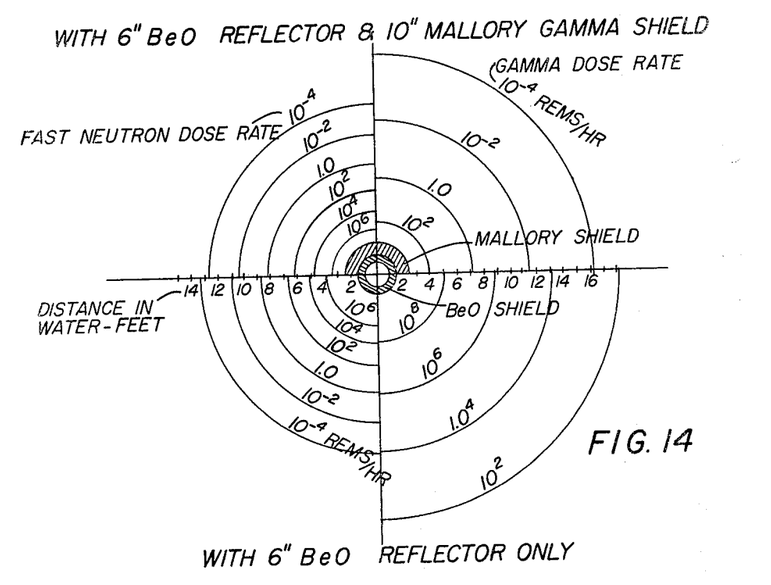
FIGURE 14 is a view showing the radiation patterns of neutron and gamma dose rates, assuming certain shielding, for a 4170 mw. reactor.
Figure 15:
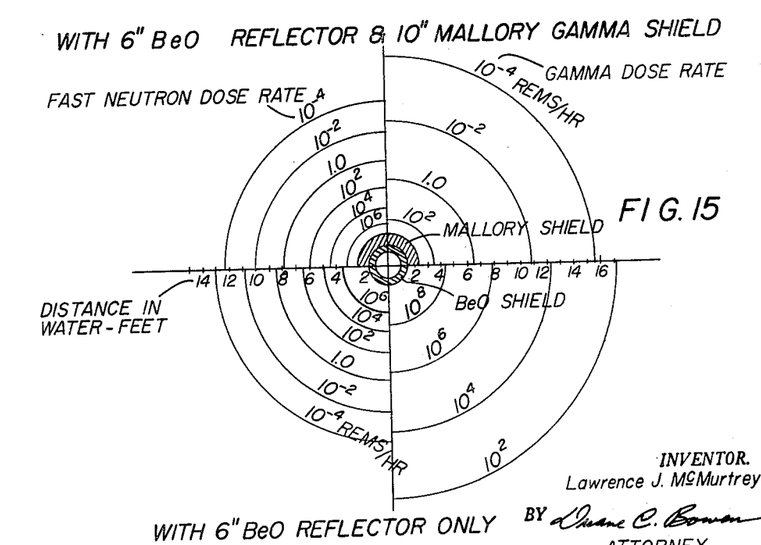
FIGURE 15 is a view similar to FIGURE 14 only showing estimated isodoses for a 1740 mw. reactor.

In both the FIGURES 7–8 construction and the FIGURES 1–6 engine, the use of shielding members, in addition to the action of the sea water as a shielding medium, may be desirable. An indication of such shielding, also applicable in modified form to FIGURES 1–6, is given in FIGURE 7. The shielding material is indicated at 210, 212 and 214 inside of the sheet metal walls of housing 146 and engine 144. The specific example of shielding material, discussed later in connection with FIGURES 14 and 15, is a six inch BeO reflector and a ten inch Mallory gamma shield. Rather than enclosing the entire system components, it may be desirable to use part or all of the shielding around only some of the components, i.e., it may be desirable in the FIGURE 7 construction to concentrate the shielding around reactor 140 and around the Na and NaK circuits. The considerations involved and the design of such shielding will be understood by those working in the art.

The operation of the FIGURE 7 system and the conditions of operation will be only briefly described, reference to the Zinn patent being made for a more complete discussion. Reactor 140 produces some heat even when the control rods 148 are in the inner, "off" position. It is desirable to keep the system flowing (by pumping and/or convection), at a reduced flow rate, even when the reactor is shut off, so that the heat from reactor 140 will be dissipated and the Na and NaK coolants will be maintained in circulation. The heat can be rejected through condenser 188 and/or engine heat exchanger 142.

To bring the engine up to power, control rods 148 are withdrawn to an outer, "on" position. Heat generated in reactor 140 (about 1.0 mw./liter) is applied to primary heat exchanger 162 through the sodium system (which rises about 400° F. to an exit temperature of above 1000° F. in the reactor). The NaK system transfers the heat (maximum temperature about 1000° F.) from the primary heat exchanger to superheater 172, boiler 176 and feed water heater 180. The water-steam system (having a maximum temperature of just under 1000° F. and a maximum pressure of about 1800 p.s.i.) circulates water through the feed water heater, boiler, superheater and engine heat exchanger 142. The temperature of the inner walls of tubes 198 adjacent steam inlet line 196 will be close to the temperatures of the steam leaving superheater 172 (a little under 1000° F.). Condenser 188 when used provides the lowest temperature point in the system which will be close to the temperature of the sea water (50° F.)—otherwise the water entering return line 186 from heat exchanger 142 is the low point.

To move sea water through tubes 198 until ram pressure is sufficient to achieve this function, a system may be used such as is shown and described in connection with FIGURE 3, e.g., pump 84, inlet doors 68, an adjustable nozzle 60 and associated components.

Water is heated in tubes 198 to provide the propulsive force. The equipment design and operation is preferably such that the sea water in tubes 198 is raised to just under vaporization pressure and temperature and then part of the sea water is permitted to flash into steam in the exhaust nozzle. The amount of heat transferable to the sea water is partly a function of the temperature and pressure in the water-steam heat transfer system, in which the maximum limit would be the critical point. The pressure and temperature given above, 1800 p.s.i. and about 1000° F., is a sufficiently high level. To shut off the engine, movement of control rods 148 back into the original, "off" position will terminate the application of heat to engine 144 in an amount sufficient for propulsion.

The FIGURE 7 system is given as a specific example of an operating cycle on the power input side of the water jet engine of the present invention. Ranges and examples of pressure, temperature, time, energy and other quantities for the FIGURE 7 nuclear, Na, NaK and steam apparatus and systems are set forth in more detail in the Zinn patent. Particular reference is made to the 800 liter reactor including the information set forth in Tables I–XI and Columns 5–26. The present specification is to be read as including the applicable material. The steam delivered to exchanger 198 can have a sufficiently high level and energy content to bring the sea water in tubes 198 to a saturated condition approaching the critical point, when this is desirable. Thermodynamic considerations on the sea water output side of the system, reviewed below, determine the amount and level of energy needed from the nuclear input side. It will be evident ample energy is available from the steam to be applied to the sea water, and the steam pressures and temperatures may be controlled to the desired level, as will be understood by those working in the art. The megawatt power output for propulsion needed for a particular ship can be achieved by controlling the size of reactor and the number and size of water jet engines used.

FIGURE 8 shows an engine 211 that is like engine 144 in those details not specifically stated to be otherwise, i.e., the engine is of ramjet type and a nuclear reactor, sodium transfer system and NaK transfer system are used. The difference is in the elimination of the steam transfer system shown in FIGURE 7 and the sea water is heated directly by the NaK coolant. The minimum transfer system is one in which the sodium is used to heat the sea water. Sodium used as a primary coolant becomes highly radioactive whereas the NaK secondary coolant can be shielded from the reactor active portion so that it remains substantially nonradioactive. As shown in FIGURE 8, the heat exchanger is divided into first, second and third heater sections 213, 215 and 216 corresponding respectively to superheater 172, boiler 176, and feed water heater 180 in FIGURE 7. As preferably the sea water does not vaporize within tubes 226, the names "superheater" and "boiler" are not used. The heat exchanger sections preferably have the labyrinth type construction formed in exchanger 142 by divider walls 200 so the sections 213, 215, 216 may be formed as one body rather than being spatially separated. As shown, the NaK coolant, from the primary sodium-NaK exchanger, enters the sea water exchanger system through line 218 and then successively passes through first heater 213, line 220, second heater 215, line 222 and third heater 216, and returns to the primary exchanger through line 224. Sea water in tubes 226 hence is heated to successively higher temperatures and pressures by heaters 216, 215 and 213 and expands partly into steam in the exit nozzle of the engine. The FIGURE 8 construction provides a simpler, more efficient propulsion system but involves somewhat more risk of sea water contamination.

As a specific example of the power input side of the FIGURES 1–6 construction, in which tubes 40 contain the nuclear fuel material or are in direct heating proximity thereto, reference is made to Table V of the Zinn patent showing temperatures of about 1000° F. on the clad surfaces of the fuel elements, which is of ample level for the direct heating of sea water.

THERMODYNAMICS OF THE WATER IN THE ENGINES

The following is an analysis of the important performance characteristics of ramjet and turbojet engine cycles using water as the working fluid, the water being heated in heat exchanger tubes in the engines by a source such as direct heating by nuclear fuel material or indirect heating through a reactor cooling system. The discussion of FIGURES 16–18 above sets forth a specific example of the thermodynamic cycle in a turbojet water engine.

Figure 11:
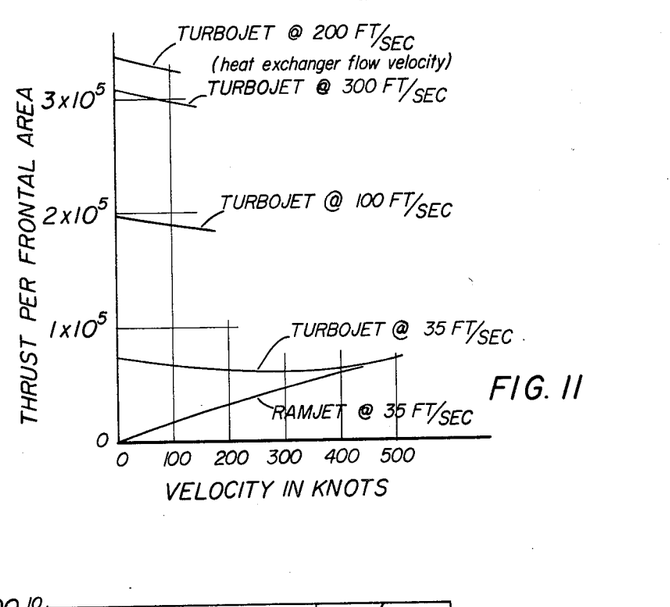
FIGURE 11 is a graph comparing thrust ($F_n$) per square foot of heat exchanger frontal area with velocity of the engine through the water, curves being given for various fluid flow velocities in the heat exchanger tubes.
Figure 12:
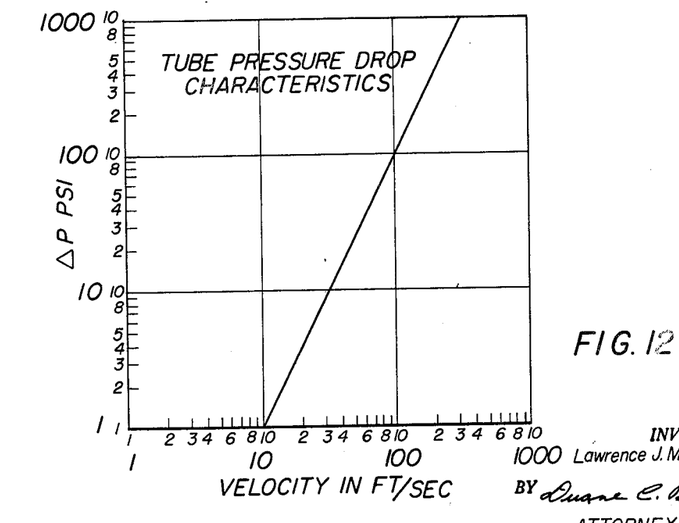
FIGURE 12 is a graph comparing the losses in pressure through a tubular type heat exchanger with fluid flow velocities through heat exchanger tubes of all diameters of adequate heat transfer characteristics.
Figure 13:
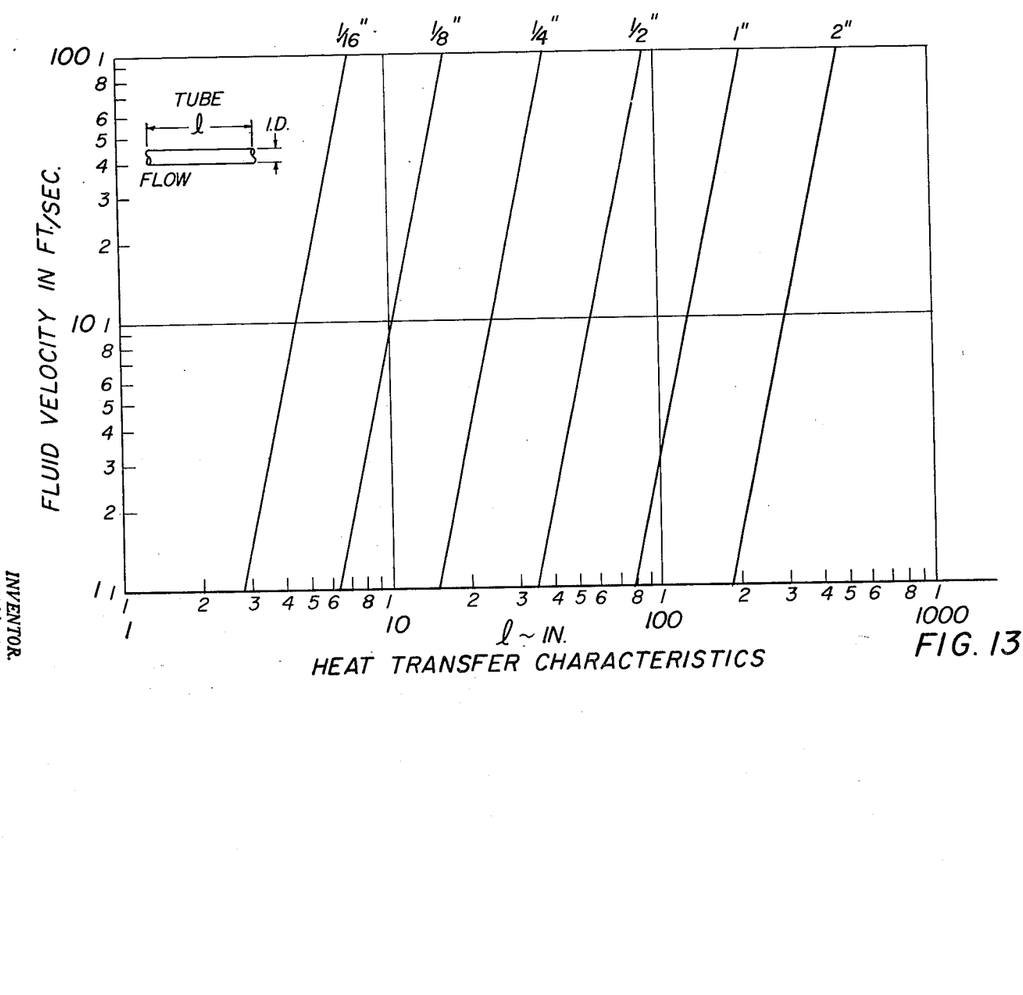
FIGURE 13 is a graph showing the relationship between fluid flow velocity in the tubes and tube diameters and lengths to obtain a selected water temperature rise from inlet to exit of the tubes.

The curve on the graph of FIGURE 11 shows the net thrust variation with engine velocity through the water and with water velocity through the heat exchanger, four examples of turbojet and one example of ramjet cycles being given. The computation was based partly on the information given in the graph of FIGURE 13 and the conditions assumed for the FIGURE 13 presentation. The FIGURE 13 graph is based on a water inlet temperature of 50° F., a water inlet pressure of 3000 p.s.i., a water outlet temperature of 695° F. and a tube wall temperature of 1000° F. The thrust values of FIGURE 11 are arrived at using 80% efficiency for the pump and turbine, and 90% efficiency for the exit nozzle. Losses in pressure through an assumed tubular type heat exchanger are given in the graph of FIGURE 12, and were accounted for in the thrust values of the graph of FIGURE 11. The $\Delta p$ characteristics of the tubes in FIGURE 12 are for the tube lengths and diameters of FIGURE 13 which were determined to meet the heat transfer rates and conditions specified in connection with the graph of FIGURE 13, providing they are proportioned according to fluid velocity in the tubes, as shown on the FIGURE 13 graph.

NOMENCLATURE

| | | |
|---|---|---|
| A | Area | ft.$^2$ |
| $C_D$ | Nozzle Coefficient | |
| $C_p$ | Specific Heat | B.t.u./lb. ° F. |
| D | Diameter | ft. |
| $F_g$ | Gross Thrust | lb. |
| $F_n$ | Net Thrust | lb. |
| $F_r$ | Ram Drag | lb. |
| g | Gravity Acceleration | ft./sec.$^2$ |
| h | Heat Flow Rate | B.t.u./sec. ft.$^2$ ° F. |
| H | Heat | B.t.u. |
| J | Mechanical Equivalent of Heat | 778 ft.-lbs./B.t.u. |
| l | Length | ft. |
| MW | Power | Megwatt. |
| $N_{Stanton}$ | Stanton No. | $h/\rho g\, C_p\, V$. |
| $N_{Reynolds}$ | Reynolds No. | $\rho V D/\mu$. |
| P | Pressure | p.s.i. |
| q | Total Pressure | $\frac{1}{2}\rho V^2$. |
| s | Entropy | |
| SHD | Shaft Horse Power | |
| T | Temperature | ° R. or ° F. |
| V | Velocity | ft./sec. |
| w | Weight Flow | lbs./sec. |
| $\rho$ | Density | slugs/ft.$^3$ or lbs.-sec.$^2$/ft.$^3$ ft. |
| $\mu$ | Viscosity | lbs.-sec./ft.$^2$ |

SUBSCRIPTS

| | |
|---|---|
| ave | Average. |
| ex | Exit of tubes. |
| in | Inlet of tubes. |
| s | Static. |
| t | Total. |
| w | Tube wall. |
| 0 | Free stream. |
| 1 | Inlet. |
| 2 | Aft of pump in turbojet or Aft of heat exchanger in ramjet. |
| 3 | Aft of heat exchanger in turbojet. |
| 4 | Aft of turbine in turbojet. |

The quantity of heat that may be added to the water is a direct function of the pressure at the heat exchanger exit when no vaporization is permitted in the heat exchanger. The temperature of the water at the heat exchanger exit in this analysis has ideally been raised to within a few degrees of the vaporization point. How close this value is approximated is a function of the hardware. The energy requirement of the pump-turbine assembly is then subtracted from the energy level of the water leaving the heat exchanger (in the case of the turbojet) and this gives an energy level of the fluid to be discharged through the exit nozzle. The energies required by the pump-turbine also influence the efficiencies of the turbojet engines.

The velocity of the exit fluid from the engine nozzle is calculated directly from:

$$V_{exit} = \sqrt{2gJ H_{nozzle\ inlet} - H_{nozzle\ exit}}$$

$$= 223.5 \sqrt{H_{nozzle\ inlet} - H_{nozzle\ exit}}$$

The values of $$H_{nozzle\ inlet} \text{ and } H_{nozzle\ exit}$$

can be obtained from a Keenan and Keyes Steam Table using a constant entropy process. For the purpose of this analysis, it is assumed that 90% of this available energy is converted to velocity in the nozzle and the net thrust is then calculated in the conventional manner:

$$F_n = F_g - F_r$$

and $F_r = \dfrac{w}{g} V$ or $$= \dfrac{w}{g} V_{engine}$$

Calculations of both the ramjet cycle and the turbojet cycle are included in the table given below.

One assumption in this analysis is the process that takes place in the exit nozzle. It is assumed that the heat content above ambient conditions of the fluid as it enters the nozzle can be converted to velocity with a 90% efficiency.

*Ramjet.*—In arriving at the net thrust curve for the ramjet engine, a set of operating conditions is established, as follows:

(1) The temperature rise through the heat exchanger is only that value to retain the $T_{t2}$ (temperature at exit of tubes) just below the vaporization point which is a direct function of engine speed.

(2) No vaporization of the water is to take place in the heat exchanger.

(3) $P_{so}=14.7$ p.s.i.

(4) System efficiency=90%. Inlet efficiency=100%.

(5) Heat exchanger in fluid flow velocity is 35 ft./sec.

Figure 9:
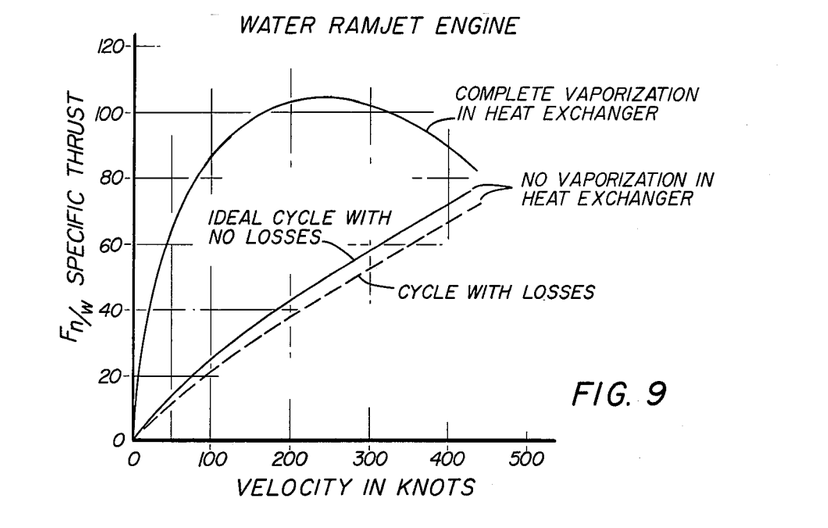
FIGURE 9 is a graph comparing specific thrust ($F_n/_w$-thrust per pound of fluid per second) of the ramjet version of the engine, with velocity of the engine (and ship) through the water, the curves being for a 35 ft./sec. velocity of water in the heat exchanger tubes.

The temperature at the exit of the heat exchanger is variable, by the operational control exercised by the control rod positions, and is held to a value just under the vaporization temperature for the particular pressure that exists. The amount of heat that may be added to the working fluid and hence the amount of energy that may be obtained from the working fluid is a function of engine pressure. The pressure of the fluid exiting from the heat exchanger is a function of the ram pressure (or velocity) and the loss through the heat exchanger. The curve of the graph of FIGURE 9 shows this trend of increasing thrust per pound of fluid per second with increasing engine (ship) speed through the water.

*Turbojet.*—The thrust of the turbojet engine is dependent also upon the quantity of heat that can be added to the working fluid. The heat is held relatively constant due to the relatively constant discharge pressure of the turbine as stipulated by the following conditions:

(1) The pump-turbine rotational speed is varied to maintain a constant $P_{t2}$ of 3000 p.s.i.a. The pressure is partly a function of the exit nozzle area.

(2) No vaporization of the water is to take place in the heat exchanger by maintaining $T_{t3}$ just below the vaporization point, controlled operationally by the position of the control rods.

(3) The mean fluid velocity is controlled by the design of the heat exchanger geometry.

(4) $P_{so}=14.7$ p.s.i.a.

(5) Pump efficiency=80%, turbine efficiency=80%, exit nozzle efficiency=90%, inlet efficiency=100%.

The heat that is added would be exactly constant if it were not for increasing $\Delta P$ occurring with higher heat exchanger fluid flow velocities which yields $P_{t3}$ conditions less than 3000 p.s.i.a. The thrust available per pound of water per second is represented by the plot on the graph of FIGURE 10 in which the thrust is related to engine velocity in knots and to fluid flow velocity (ft./sec.) through the heat exchanger.

*Heat Exchanger.*—The characteristics of the heat exchanger in both the ramjet and turbojet engine play an important part in the overall engine performance. An analysis was conducted to determine how the variables of any heat exchanger may be changed to give optimum performance.

A typical heat transfer equation which may be applied to a tubular type heat exchanger is as follows:

$$N_{\text{Stanton}}=\frac{0.3}{(N_{\text{Reynolds}})^{.2}}$$

or $$H=.03\pi g\rho^{.8}CpV^{.8}\mu^{.2}D^{.8}l(T_{\text{wall}}-T_{\text{fluid bulk}})$$

This equation contains all the major variables in the proper proportions that affect the heat transfer rate from the tube to the fluid being heated.

The following equation represents the required heat transfer rate for a fluid passing through a tubular heat exchanger:

$$H=WCp(T_{\text{exit bulk}}-T_{\text{inlet bulk}})$$

$$=g\frac{\rho\pi D^2}{4}VCp(T_{\text{exit bulk}}-T_{\text{inlet bulk}})$$

Equating the heat transfer rate required by the fluid to that available from the tube permits a determination of the variables that will give an optimum heat exchanger when considering the following desirable characteristics:

(a) Minimum physical size for a given mass flow rate.

(b) Minimum pressure drop for a given mass flow rate.

Thus:

$$.03\pi g\rho^{.8}CpV^{.8}\mu^{.2}D^{.8}l(T_w-T_{\text{fluid bulk}})$$

$$=g\frac{\rho\pi D^2}{4}VCp(T_{\text{exit}}-T_{\text{inlet}})$$

or $$.03\mu^{.2}l(T_w-T_{\text{fluid bulk}})=\frac{\rho^{.2}D^{1.2}}{4}V^{.2}(T_{\text{exit}}-T_{\text{inlet}})$$

also, Heat Available=Heat Required.

It can be seen that the following changes in variables, by the design, are desirable:

(a) Increase $$\mu, l, T_w \text{ and } T_{\text{inlet}}$$

(b) Decrease $$\rho, D, V, T_{\text{exit}} \text{ and } T_{\text{fluid bulk}}$$

The only variable of physical dimension that has significance is the tube diameter and thus should be a minimum to give an optimum heat exchanger design. Other terms are fixed by the design rules and/or have minor effect on the heat exchanger design.

The graph of FIGURE 13 of heat transfer characteristics shows how the length of the tube in a heat exchanger must be varied with tube diameter and flow velocity to retain a given heat exchanger exit condition. The tube length is read to transfer heat to meet specified conditions. From this curve it can be seen the smaller diameter tubes will require the least length.

One other important question to be answered is how the pressure drop through the tubes is affected by varying diameter and length in accordance with the graph of FIGURE 13. It has been found that when heating water to given exit conditions the pressure drop for all size tubes varies only as the fluid velocity as shown by the curve of the graph of FIGURE 12, which applies to all tube diameters. This condition can be visualized when the graph of FIGURE 13 is examined and it is observed, for a fixed flow velocity, the length required for a fixed temperature rise decreases with decreasing tube diameter. The graph of FIGURE 12 gives the $\Delta P$-velocity characteristics for all diameter tubes that will transfer the heat required by the particular conditions being investigated. In the present design, it is assumed that 50% of the face area of the heat exchanger is flow area, e.g., the interior diameters of the tubes. When the heat exchanger production design is optimized, this value can be approximated and the spacing of water passageways will be closer than that shown in FIGURE 5.

Radiation patterns in the form of neutron and gamma dose rates are given in FIGURES 14 and 15. Each figure has been calculated for a two foot diameter reactor having a shield, in addition to the shielding effect of water, formed by six inches of BeO and ten inches of "Mallory" (an alloy similar to lead for attenuation of gamma radiation but able to sustain stresses at relative high temperatures). The lower part of each figure shows conditions with only a BeO shield and the upper part of each figure shows conditions with both BeO and Mallory shields. Gamma dose rates are shown on the right and fast neutron dose rates are shown on the left. From these figures it can be seen that with both the BeO and Mallory shielding a man can inhabit the area within a radius of approximately 14 feet of the reactor for both power rates. Any additional structure such as the skin of a ship will further reduce the dose rate. It has been assumed that the allowable dose rate is 300 milirems/wk. or .00179 rems./hr. continuously.

The following conclusions are made from the foregoing analysis and from the results shown by the graphs and set forth in the following table:

(1) A ramjet or turbojet using water as the working medium and nuclear energy as the heat source is a good source of propulsion.

Figure 10:
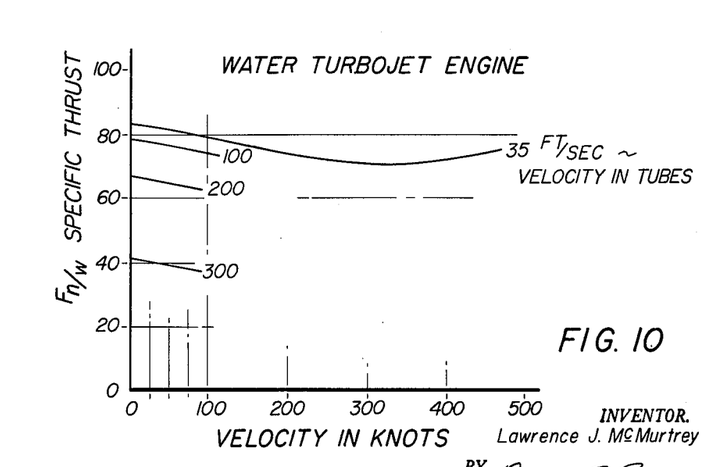
FIGURE 10 is a graph making a similar comparison to that of FIGURE 9 only for the turbojet version of the engine, curves being given for various fluid flow velocities in the heat exchanger tubes.

(2) The thrust characteristics of water ramjets and turbojets are similar to those presented by the curves of FIGURES 9 and 10.

(3) Heat exchanger flow velocities of approximately 100 ft./sec. give a good compromise of pressure loss, tube size, tube length, and heat exchanger frontal area.

(4) Heat exchanger length is a function of tube diameter and a ¼ inch diameter tube will require a length of approximately 40 inches, which is a reasonable configuration.

of the exit nozzle are respectively 797, 781, and 620 B.t.u./lb. The specific thrust $Fn/_w$ is 78.3, as also shown by FIGURE 10. Table I gives many more examples for both turbojet and ramjet engines. The examples are equally applicable to direct (FIGURES 1–6) and indirect (FIGURES 7–8) nuclear heating systems, e.g., the requirement from the reactor is that the temperature produced in the tube walls be of a level producing the selected water velocity in the tubes. The temperatures on the tube walls are controlled by the positions of the reactor control rods.

APPLICATION TO UNDERWATER AND SURFACE VESSELS

The following calculations show the power requirements for a submarine and a destroyer. A heat exchanger diameter of two feet is selected and heat exchanger flow velocities are varied to obtain the required power output. The power input may be provided by direct heating by nuclear fuel material (FIGURES 1–6) or by a reactor and a coolant transfer system (FIGURES 7–8).

*Submarine.*—A submarine 10 feet in diameter and 120

*Table I*

TURBOJET (NO VAPORIZATION IN HEAT EXCHANGER)

| Engine velocity, knots | Vel. in tubes, ft./sec. | $P_{t1}$, p.s.i.a. | $\Delta P$ across pump, $P_{t1}-P_{t2}$ | B.t.u./lb. req'd for pump, 80% eff. | B.t.u./lb. req'd by turb., 80% eff. | Heat at Sta. 3, B.t.u./lb. | Heat at Sta. 4, B.t.u./lb. | Heat at exit, B.t.u./lb. | $\Delta h$ avail., 90% $h_4-h_{exit}$ | $V_{exit}$, ft./sec. | $V_{exit}-V_{inlet}$ | Fn/w | Flow area, ft.²/lb./sec. | Reactor area, ft.²/lb./sec. |
|---|---|---|---|---|---|---|---|---|---|---|---|---|---|---|
| 0 | 35 | 14.7 | 2,985 | 13.8 | 17.3 | 797 | 780 | 620 | 144 | 2,680 | 2,680 | 83.8 | 0.00067 | 0.00134 |
| 50 | 35 | 62.7 | 2,937 | 13.6 | 17.0 | 797 | 780 | 620 | 144 | 2,680 | 2,595 | 80.6 | .00067 | .00134 |
| 100 | 35 | 207.0 | 2,793 | 12.90 | 16.2 | 797 | 781 | 620 | 145 | 2,690 | 2,520 | 78.3 | .00067 | .00134 |
| 150 | 35 | 445.0 | 2,555 | 11.80 | 14.8 | 797 | 782 | 620 | 146 | 2,700 | 2,450 | 76.1 | .00067 | .00134 |
| 200 | 35 | 782 | 2,218 | 10.3 | 12.8 | 797 | 784 | 620 | 147.5 | 2,720 | 2,380 | 74.0 | .00067 | .00134 |
| 300 | 35 | 1,735 | 1,265 | 5.85 | 7.3 | 797 | 790 | 620 | 153 | 2,770 | 2,270 | 70.5 | .00067 | .00134 |
| 400 | 35 | 3,065 | ------ | 0 | 0 | 797 | ------ | 620 | 177 | 2,980 | 2,305 | 71.6 | .00067 | .00134 |
| 0 | 35 | 14.7 | 2,985 | 13.8 | 17.30 | 797 | 780 | 620 | 144 | 2,680 | 2,680 | 83.3 | .00067 | .00134 |
| 0 | 100 | 14.7 | 2,985 | 13.8 | 17.30 | 780 | 763 | 620 | 129 | 2,540 | 2,680 | 78.9 | .0002 | .0004 |
| 0 | 200 | 14.7 | 2,985 | 13.8 | 17.30 | 740 | 723 | 620 | 93 | 2,160 | 2,680 | 67.0 | .0001 | .0002 |
| 0 | 300 | 14.7 | 2,985 | 13.8 | 17.30 | 677 | 660 | 620 | 36 | 1,340 | 2,680 | 41.6 | .000067 | .000134 |

RAMJET (NO VAPORIZATION IN HEAT EXCHANGER)

| Engine velocity, knots | $P_{t1}$, p.s.i.a. | $T_{t2}$, boiling point temp. °F. | S of satur. liquid | h, B.t.u./lb. | Heat, 212° F. and const. entropy | $\Delta h$ avail. for vel. | $V_{exit}$, ft./sec. | $\Delta V$ | Fn/w, 80% eff. |
|---|---|---|---|---|---|---|---|---|---|
| 20 | 22.37 | 233.5 | 0.344 | 202 | 201 | 1 | 224 | 190 | 4.0 |
| 40 | 45.2 | 274.5 | .402 | 243.5 | 240 | 3.5 | 419 | 352 | 7.0 |
| 60 | 83.6 | 315 | .457 | 285 | 277 | 8 | 633 | 532 | 11.0 |
| 100 | 207 | 384 | .547 | 358 | 342 | 16 | 895 | 726 | 20.5 |
| 150 | 445 | 455 | .634 | 436 | 400 | 36 | 1,340 | 1,087 | 30.0 |
| 200 | 782 | 515 | .708 | 507 | 445 | 62 | 1,760 | 1,422 | 36 |
| 300 | 1,735 | 615 | .835 | 640 | 525 | 115 | 2,400 | 1,900 | 54 |
| 400 | 3,065 | 698 | .98 | 815 | 625 | 190 | 3,080 | 2,405 | 68 |

Table I, together with the information previously set forth, shows details on a number of operating examples. To review one of these examples, a turbojet engine according to the present invention is started by moving control rods 44 to an outer position whereby the inner walls of tubes 40 heat to an applicable level up to about 1000° F. Motor 45 operates pump 24 until sufficient power is developed in turbine 26. The velocity of the engine (the velocity of the ship through the water) is brought from 0 to 100 knots. Pressure at $P_{t1}$ rises from 14.7 to 207 p.s.i.a. as the engine velocity is brought to 100 knots. The change in pressure across the pump, at the two speeds, is 2985 and 2793 p.s.i. resulting in a pressure $P_{t2}$ of about 3000 p.s.i. The temperature of the water from inlet to exit in tube passageways 42 goes from 50° F. to 695° F. The velocity of the water in the tubes is 35 ft./sec. and the tube pressure drop is shown by FIGURE 12, e.g. about 10 p.s.i. The water-steam mixture aft of the tubes transfers energy to the turbine and the velocity in the exit nozzle 22 is 2690 ft./sec. The heat at station 3 (aft of exchanger), and Station 4 (aft of turbine), and at the end feet long with proper shape for minimum drag at 100 knots is assumed.

$$D = q C_D A$$

$$= \frac{62.4}{32.2} \frac{169^2}{2} (.08) \, .785 \, (10)^2$$

$$= 27600 \, (.08) \, (78.5) = 173000 \text{ lbs.}$$

Using a heat exchanger diameter of 2 feet:

$$F/A = \frac{173000}{.785(2)^2} = \frac{173000}{3.14} = 5.5 \times 10^4 \frac{\text{lbs. F}}{\text{ft.}^2}$$

From the data given above, the heat exchanger flow velocity will be 30 ft./sec.
The power requirement $$= g \, \rho_{ave} \frac{A V_{ave}}{2} \frac{\text{B.t.u./lb. flow}}{948 \text{ B.t.u./sec./mw.}}$$

$$= 50 \frac{3.14 \, (30)}{2} \frac{700}{948}$$

$$= 1740 \text{ Megawatts}$$

Following the FIGURE 15 shielding construction, the weight of the BeO and Mallory shield is 72,360#.

*Destroyer.*—A destroyer requiring 60,000 S.H.P. for a speed of 35 knots is assumed. The equivalent F is:

$$F = \frac{60,000 \text{ S.H.P.} \times 80\% \text{ eff. } (550)}{59.1 \text{ ft./sec}}$$

$$= 4.46 \times 10^5 \text{ lbs.}$$

Using a heat exchanger diameter of two feet:

$$\frac{F}{A} = \frac{4.46 \times 10^5}{.785(2)^2} = 1.42 \times 10 \frac{\text{lbs. F}}{\text{ft.}^2}$$

From the data given above, the heat exchanger flow velocity required will be 72 ft./sec.
The power requirement $$= g \frac{\rho_{ave} \frac{A}{2} V_{ave} \text{ B.t.u./lb. of liq. flow}}{948 \text{ B.t.u./sec. mw.}}$$

$$= 50 \frac{3.14}{2} \frac{72}{948} \frac{700}{}$$

$$= 4170 \text{ Megwatts}$$

Following the FIGURE 14 shielding construction, the weight of the BeO and Mallory shield is 104,740#.

To obtain the required power for any given vessel, it will be understood that one or more jet engines may be used. In the FIGURE 7 type of installation in which a heat transfer system is interposed between reactor and engine heat exchanger, the reactor may be used as a heat source for more than one jet engine.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:

1. A ship water jet propulsion system having an engine with an inlet duct receiving water from a free body of water and with an exit nozzle returning water to said free body of water, said engine having interposed between said inlet duct and exit nozzle a heat exchanger having a series of water passageways therethrough whereby water may pass from said inlet duct to said exit nozzle through said passageways, a nuclear fission reactor spaced from said heat exchanger and an interposed heat interchanging system between said reactor and said heat exchanger operative to pick up heat from said reactor and to transfer the heat to said heat exchanger and to apply the heat to heat the water in the heat exchanger passageways whereby ship propulsion is achieved by heating of said water in said passageways to a level producing steam jet propelling forces as the water is discharged from said pasageways and out of said nozzle, and control means operative to control said reactor.

2. The subject matter of claim 1 in which said inlet duct, heat exchanger and exit nozzle are arranged serially in line with no obstructions therebetween and said inlet duct receives water by ram action, whereby said engine is of ram-jet type, said exit nozzle having expandable and contractible segments for controlling the rate of flow therethrough, door means in said inlet duct and spring means urging the door means to a closed position and said door means being disposed to open against said spring means by ram action of water into said inlet duct whereby the water in the inlet duct is segregated from water outside of the doors until ram pressure is generated, and a pump having discharge means disposed to discharge water under pressure between said door means and said heat exchanger to start said engine.

3. The subject matter of claim 2 in which there is an electric motor connected to said pump to drive the same in the initial starting action, a turbine having an inlet passageway from the area between said heat exchanger and said exit nozzle whereby said turbine may be driven by water heated by passing from said inlet duct through said heat exchanger and through said inlet passageway to said turbine, said turbine being connected to said pump to drive the same in starting the engine after water in said engine has been heated and sufficient pressure is generated to operate said turbine.

4. The subject matter of claim 1 in which there is a pump disposed between said inlet duct and said heat exchanger and there is a turbine between said heat exchanger and said exit nozzle, connecting drive means between said turbine and said pump for driving of the pump by the turbine, said pump transversely bridging the space between said inlet duct and said heat exchanger and wall means forming bypass channels around said turbine for part of the water passing through said pump whereby the engine is of combined turbo-ram jet type.

5. The subject matter of claim 1 in which said engine has a pump between said inlet duct and said heat exchanger and a turbine between said heat exchanger and said exit nozzle in aligned series, said turbine being connected to said pump for driving of the pump by the turbine, whereby said engine is of turbojet type.

6. The subject matter of claim 5 in which there is starter power means connected to said pump to rotate the pump forcing water through said heat exchanger when the engine is being started.

7. The subject matter of claim 1 in which said inlet duct, heat exchanger and exit nozzle are arranged serially in line with no obstructions therebetween and said inlet duct receives water by ram action whereby said engine is of ram-jet type.

8. The subject matter of claim 1 in which said interposed heat interchanging system includes a primary coolant circuit to said reactor, the primary coolant being a liquid other than said water from outside said engine that passes through said heat exchanger water passageways.

9. In a ship water jet propulsion system having an engine with an inlet duct receiving water from a free body of water and with an exit nozzle returning water to said free body of water, the improvement, comprising: said engine having interposed between said inlet duct and exit nozzle a heat exchanger having a series of water passageways therethrough whereby water may pass from said inlet duct to said exit nozzle through said passageways, said inlet duct, heat exchanger and exit nozzle being arranged serially in line with no obstructions therebetween and said inlet duct receiving water by ram action whereby said engine is of ram-jet type, a nuclear fission reactor spaced from said heat exchanger and an interposed heat interchanging system between said reactor and said heat exchanger operative to pick up heat from said reactor and to transfer the heat to said heat exchanger and to apply the heat to heat the water in the heat exchanger passageways, and control means operative to control said reactor, support means supporting said engine from said ship at a level below the ship water line and spaced from the ship hull whereby the water between the ship and the engine acts to shield the ship from nuclear radiation from said reactor.

References Cited in the file of this patent
UNITED STATES PATENTS 2,461,797    Zwicky _______________ Feb. 15, 1949

(Other references on following page)

UNITED STATES PATENTS

| | | | |
|---|---|---|---|
| 2,702,516 | Tinker | Feb. 22, | 1955 |
| 2,797,659 | Haase et al. | July 21, | 1957 |
| 2,841,545 | Zinn | July 1, | 1958 |
| 2,894,891 | Grebe | July 14, | 1959 |
| 2,974,495 | Pinnes et al. | Mar. 14, | 1961 |
| 3,013,384 | Smith | Dec. 19, | 1961 |

FOREIGN PATENTS

| | | | |
|---|---|---|---|
| 1,024,536 | France | Jan. 10, | 1953 |
| 754,559 | Great Britain | Aug. 8, | 1956 |
| 1,137,047 | France | Jan. 7, | 1957 |

OTHER REFERENCES

Space/Aero Engineering, April 1959.